Oct. 24, 1950   J. R. DUNN ET AL   2,526,856
CONVEYER SYSTEM
Filed Oct. 22, 1946

INVENTORS
J.R. DUNN
B.M. SMITH
BY
ATTORNEY

Patented Oct. 24, 1950

2,526,856

UNITED STATES PATENT OFFICE 2,526,856

CONVEYER SYSTEM

John R. Dunn, South Groveland, Mass., and Bruce M. Smith, East Point, Ga., assignors to Western Electric Company, Incorporated, New York, N. Y., a corporation of New York Application October 22, 1946, Serial No. 704,806

2 Claims. (Cl. 198—25)

This invention relates to conveyor systems and more particularly to mechanisms therein for transporting containers from one conveyor to another.

In conveyor systems, it is necessary at times to make a right angle turn from one conveyor to another where limited space prevents the conventional curved connections between conveyors. If the containers or articles being transported are smaller in every dimension than the width of the conveyors, no difficulty should arise, but if for example, the containers or articles should be greater in length than the width of the conveyors a problem of guiding or turning the containers or articles at the juncture of the conveyors arises.

An object of the invention is to provide a conveyor system including a highly efficient and accurate mechanism connecting conveyors disposed at right angles with respect to each other for efficiently transporting articles from one conveyor to another.

The invention broadly includes conveyors disposed at angles with respect to each other and a controlling mechanism interposed between the conveyors to turn articles received from one of the conveyors through an arc comparable to the angle at which the conveyors are positioned with respect to each other whereby the articles may travel on the second conveyor.

More specifically the controlling or turning mechanism comprises a plurality of rollers extending transversely across the end of the feeding conveyor slightly above the level of the receiving conveyor so that the conveyed articles overbalance thereon in passing to the receiving conveyor. To effect an abrupt change in the direction of the article's motion at the turn, the roller at the outside of the turn is positively driven but the other rollers are free so that they may rotate at lower speeds and reverse in direction as the conveyed article pivots around a vertical roller at the inside of the turn.

Other objects and advantages will be apparent from the following detailed description when considered in conjunction with the accompanying drawing, wherein Fig. 1 is a fragmentary top plan view of a conveyor system illustrating the invention;

Figure 1:
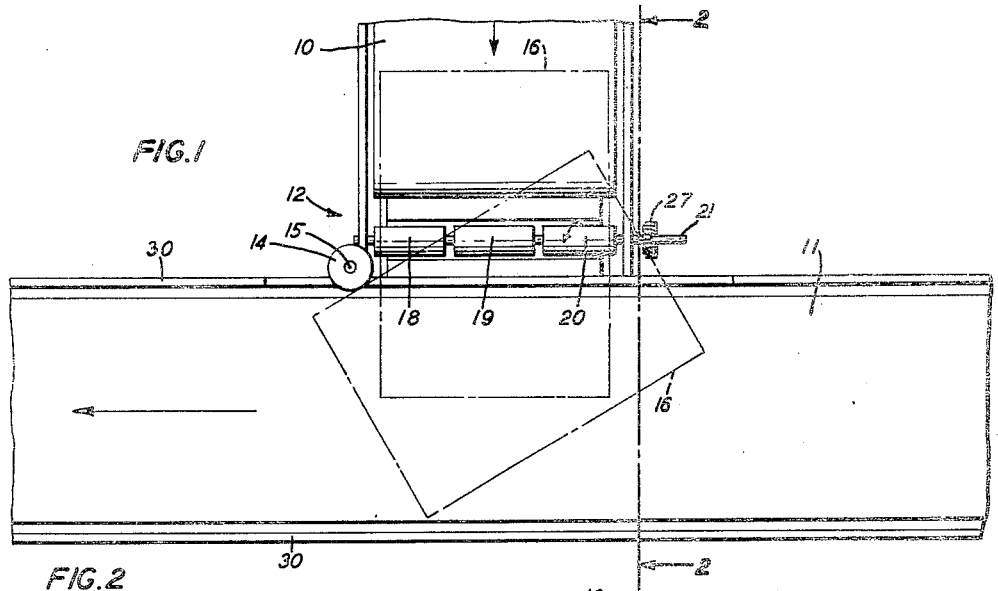

Referring now to the drawing, a feeding conveyor 10 is disposed at right angles with respect to a receiving conveyor 11 and a control mechanism 12 is interposed between the conveyors, preferably at the exit end of the conveyor 10. The mechanism 12 includes a vertical roller 14 mounted upon a suitable shaft 15 and free to rotate when engaged by an article or container 16. In Fig. 1 two positions of the article or container 16 are illustrated. In the first position the article is about to tilt so that its leading end will engage the conveyor 11. In the second position the article has completed about half its turn onto the conveyor 11.

Figure 2:
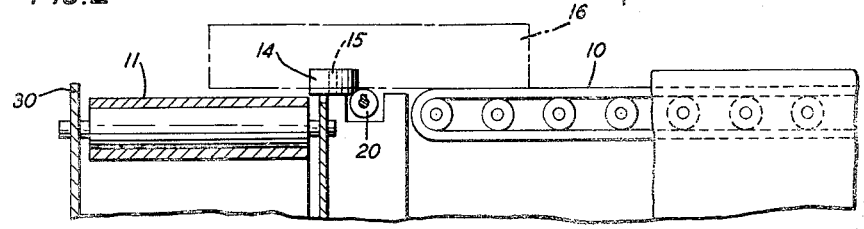
Fig. 2 is a fragmentary sectional view taken along the line 2—2 of Fig. 1.
Figure 3:
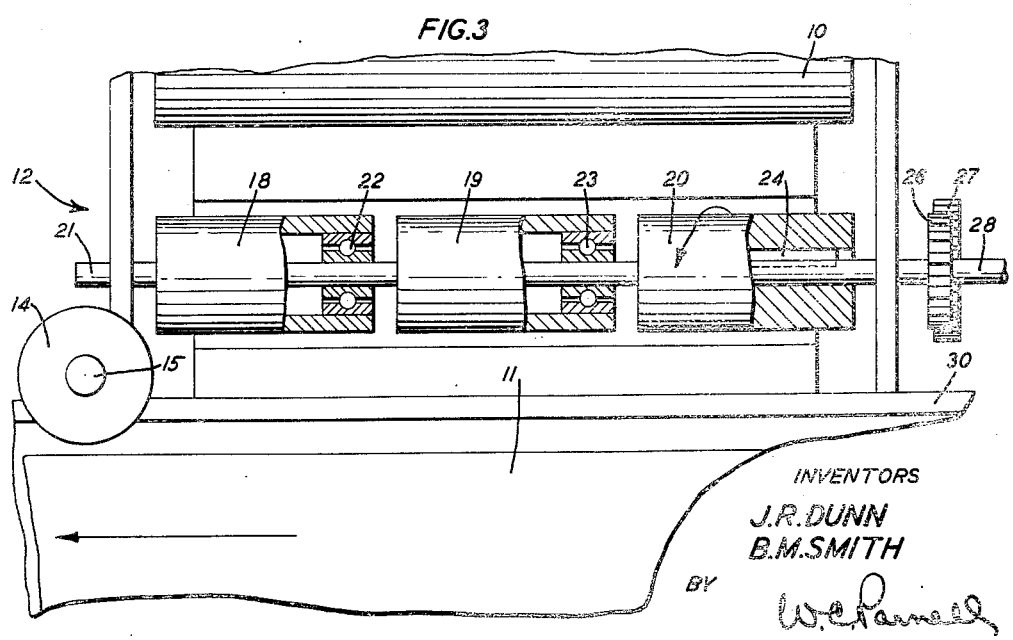
Fig. 3 is an enlarged fragmentary top plan view of the control mechanism, portions of the series of rollers being shown in section.

By viewing Fig. 2, it will be observed that the supporting surface of the conveyor 10 lies in a plane above the supporting surface of the conveyor 11. A series of rollers 18, 19 and 20 is disposed between the exit end of the conveyor 10 and the adjacent side of the conveyor 11, the upper peripheries of the rollers lying in the plane of the supporting surface of the conveyor 10. In the present illustration the rollers 18 to 20, inclusive, are mounted upon a common shaft 21, the rollers 18 and 19 being supported by bearings 22 and 23 on the shaft so that they may rotate freely thereon while the roller 20 is keyed to the shaft as illustrated at 24. The shaft 21 has a gear 26 mounted upon one end thereof which interengages a driving gear 27 of a main shaft 28, the main shaft being driven by any suitable power means (not shown).

During the operation of the conveyor system, the article 16 may travel successively toward the conveyor 11 on the conveyor 10. These articles will continue as illustrated in Fig. 2 (and in the first position Fig. 1) until their centers of gravity have passed beyond the series of rollers after which they will tilt until their leading ends will rest upon the conveyor 11. The conveyor 11, that is, the upper supporting surface thereof, traveling in the direction of the arrow will move the article to the left until it engages the roller 14, through the aid of which the article will be held on to the conveyor 11. Through the continuous driving of the roller 20 at a given speed the article is turned onto the conveyor 11 before it can become jammed between the roller 14 and the side flange 30 of the conveyor 11. The action of the roller 20 begins before the article engages the conveyor 11, particularly during the tilting of the article as the driving force of the roller 20 engages the article at the side farthest from the roller 14. The rollers 18 and 19 are free to rotate on the shaft 21 as it is desirable for them to be able to rotate in either direction, and at speeds differing from that of the roller 20. While the article is moving from the conveyor 10 toward the conveyor 11 the rollers 18 and 19 will rotate in the same direction as the roller 20. However, during the turning of the article, the rollers 18 and 19 will not rotate at the same speed as the roller 20, they being under the control of the article and free to rotate in a reverse direction if necessary. During a portion of the movement of the article, while one side is being retarded by the roller 14 and the other side and following end of the article are accelerated by the roller 20, the side of the article adjacent the roller 14 may move in a direction opposite the direction of movement of the conveyor 11 causing reverse rotation of the rollers 18 and 19.

It is apparent from this description that the simple mechanism 12 interposed between the feeding conveyor 10 and the receiving conveyor 11 is highly efficient in transferring articles from one conveyor to the other and turning the articles through an angle comparable to the relative positions of the conveyors without retarding the speed of travel of the articles on the conveyor system.

Although specific improvements of the invention have been shown and described, it will be understood that they are but illustrative and that various modifications may be made therein without departing from the scope and spirit of this invention as defined by the appended claims.

What is claimed is:

1. A conveyor system comprising a receiving conveyor having an article supporting surface traveling in a given direction, a feeding conveyor disposed at an angle with respect to the receiving conveyor and having an article supporting surface disposed in a plane above the supporting surface of the receiving conveyor to feed an article over and free of the receiving conveyor, a driven shaft mounted for rotation between the conveyors, rollers mounted on the shaft beneath and substantially tangent with the said plane to cooperate with the feeding conveyor to feed the article over and free of the receiving conveyor until over half the article has moved beyond the rollers when the article will tilt by gravity into engagement with the receiving conveyor, one of the rollers being fixed to the shaft to rotate therewith at a given speed to cause turning of the article onto the receiving conveyor while another of the rollers is free to rotate on the shaft at a slower speed.

2. A conveyor system comprising a receiving conveyor having an article supporting surface traveling in a given direction, a feeding conveyor disposed at an angle with respect to the receiving conveyor and having an article supporting surface disposed in a plane above the supporting surface of the receiving conveyor to feed an article over and free of the receiving conveyor, a driven shaft mounted for rotation between the conveyors, rollers mounted on the shaft beneath and substantially tangent with the said plane to cooperate with the feeding conveyor to feed the article over and free of the receiving conveyor until over half the article has moved beyond the rollers when the article will tilt by gravity into engagement with the receiving conveyor, and an element mounted adjacent the juncture of the conveyors to be engaged by the article and about which the article moves in an arc in its movement from the feeding conveyor onto the receiving conveyor, one of the rollers, farthest from the element, being fixed to the shaft to rotate therewith at a given speed to cause turning of the article through its arcuate movement onto the receiving conveyor while another of the rollers is free to rotate on the shaft at a different speed and cooperate with the fixed roller in holding the major portion of the article free of the receiving conveyor until the article has substantially completed its turn onto the receiving conveyor.

JOHN R. DUNN.
BRUCE M. SMITH.

REFERENCES CITED

The following references are of record in the file of this patent:

UNITED STATES PATENTS

| Number | Name | Date |
| --- | --- | --- |
| 875,385 | Smith | Dec. 31, 1907 |
| 1,034,641 | Parker | Aug. 6, 1912 |
| 1,820,674 | Olson | Aug. 25, 1931 |
| 1,860,718 | Mott | May 31, 1932 |
| 1,899,337 | Keech | Feb. 28, 1933 |
| 2,304,473 | Paxton et al. | Dec. 8, 1942 |